United States Patent
Dunn et al.

(10) Patent No.: US 12,516,466 B2
(45) Date of Patent: Jan. 6, 2026

(54) LAUNDRY APPLIANCE FILTER WITH BIASING ELEMENTS

(71) Applicant: Haier US Appliance Solutions, Inc., Wilmington, DE (US)

(72) Inventors: David Scott Dunn, Louisville, KY (US); Dimitar Tcholakov, Louisville, KY (US); Marla Boado Encinosa, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 333 days.

(21) Appl. No.: 18/094,742

(22) Filed: Jan. 9, 2023

(65) Prior Publication Data
US 2024/0229345 A1  Jul. 11, 2024

(51) Int. Cl.
*D06F 58/22* (2006.01)
*B01D 46/00* (2022.01)
*D06F 25/00* (2006.01)

(52) U.S. Cl.
CPC ......... *D06F 58/22* (2013.01); *B01D 46/0009* (2013.01); *D06F 25/00* (2013.01); *B01D 2265/024* (2013.01); *B01D 2271/02* (2013.01); *B01D 2279/55* (2013.01)

(58) Field of Classification Search
CPC ...... D06F 39/04; D06F 58/22; B01D 46/0009
See application file for complete search history.

(56) References Cited

U.S. PATENT DOCUMENTS

| | | | |
|---|---|---|---|
| 3,718,982 A * | 3/1973 | Deaton | D06F 58/22 219/400 |
| 11,142,864 B2 | 10/2021 | Bocchino et al. | |
| 2021/0222345 A1* | 7/2021 | Jung | D06F 34/14 |

FOREIGN PATENT DOCUMENTS

| | | | |
|---|---|---|---|
| CN | 106948147 B | | 7/2019 |
| CN | 115387097 A | * | 11/2022 |
| DE | 3538174 A1 | | 4/1987 |
| DE | 102016114646 B4 | | 12/2018 |
| EP | 2881512 B1 | | 6/2017 |

OTHER PUBLICATIONS

CN115387097A Machine Translation (Year: 2022).*

* cited by examiner

*Primary Examiner* — Spencer E. Bell
(74) *Attorney, Agent, or Firm* — Dority & Manning, P.A.

(57) ABSTRACT

A laundry appliance includes a cabinet defining an interior volume and a housing mounted within the interior volume of the cabinet. The laundry appliance also includes an air filter assembly positioned in the housing. The air filter assembly includes a shell, a sealing member on a face of the shell, and a biasing element configured to bias the shell into sealing engagement with the housing.

16 Claims, 14 Drawing Sheets

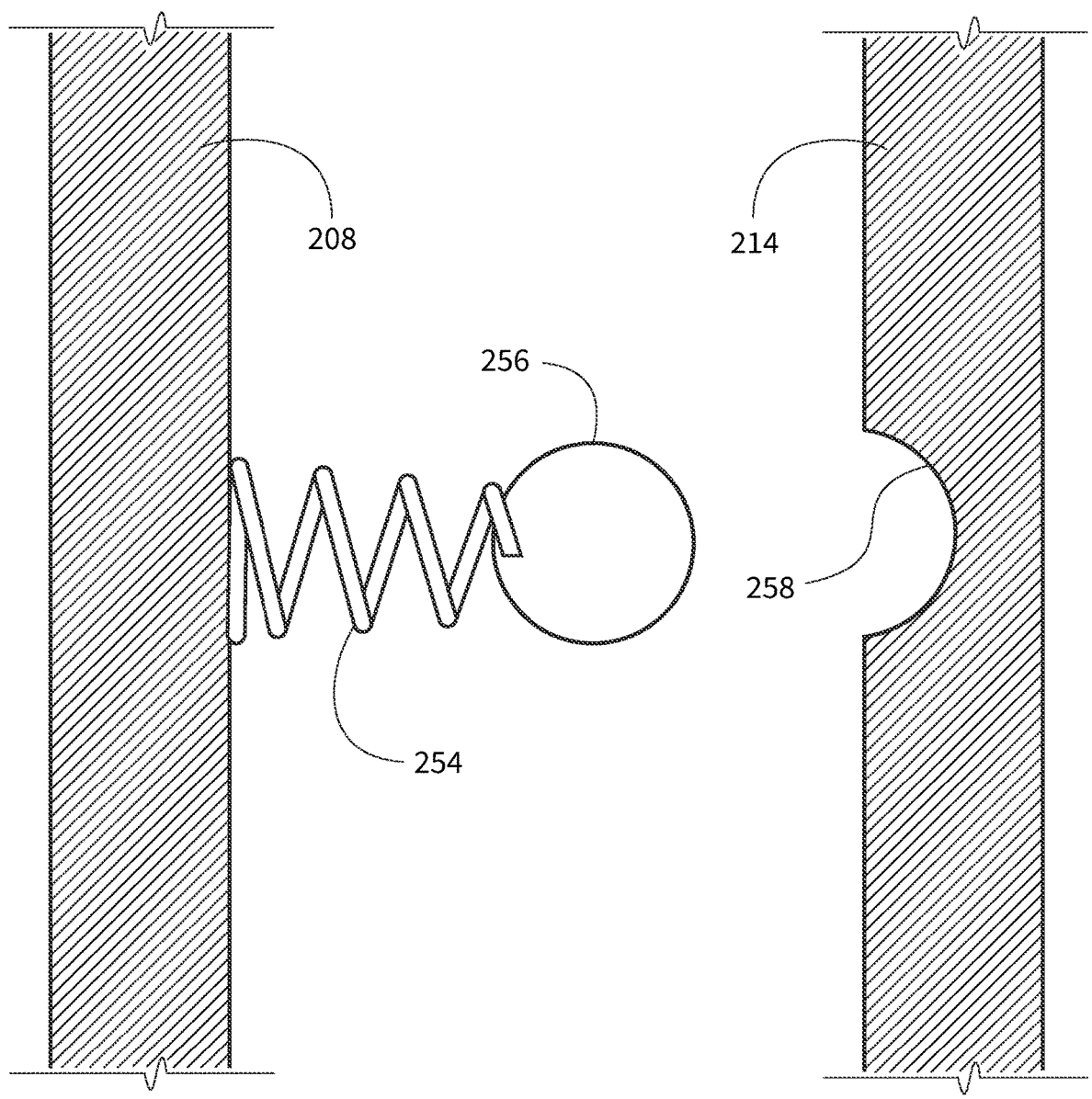
FIG. 13　　　　　　　　　　　　　　　　　　　　　　　　　FIG. 14

LAUNDRY APPLIANCE FILTER WITH BIASING ELEMENTS

FIELD OF THE INVENTION

The present subject matter relates generally to laundry appliances, and more particularly to air filters for laundry appliances.

BACKGROUND OF THE INVENTION

Laundry appliances include washing machine appliances, dryer appliances, and combination laundry appliances. Combination laundry appliances, sometimes also referred to as washer/dryer appliances, provide both washing and drying functions in a single unit. During the washing and drying operations, particles from clothing articles being treated therein, such as fiber particles, are dislodged and may become entrained in the flow of air through the laundry appliance. Such particles, e.g., lint, may impair the performance of the laundry appliance's heating system if the particles are carried to, for example, a heater of the heating system, by the flow of air. Thus, laundry appliances typically include at least one air filter, sometimes also referred to as a lint filter, to entrap such particles and remove the particles from the air flow. Over time, when the entrapped particles accumulate on the air filter, the air filter may be removed from the laundry appliance in order to clean the air filter, e.g., to remove the accumulated particles.

When the air filter is installed in the laundry appliance, it is desirable to form a seal with adjacent components, e.g., to avoid or restrict bypass air flow around the air filter. However, removing and reinstalling the air filter, e.g., for cleaning, may result in excess wear on sealing elements of the air filter.

Accordingly, a laundry appliance having improved features for promoting sealing engagement of a removable air filter would be advantageous.

BRIEF DESCRIPTION OF THE INVENTION

Aspects and advantages of the invention will be set forth in part in the following description, or may be obvious from the description, or may be learned through practice of the invention.

In one aspect of the present disclosure, a laundry appliance is provided. The laundry appliance includes a cabinet that defines an interior volume with a tub mounted within the interior volume of the cabinet. A laundry basket is rotatably mounted within the tub. The laundry basket defines a chamber for the receipt of articles for treatment. The laundry appliance also includes a heating system in thermal communication with the chamber whereby heated air flows from the heating system to the chamber. An air filter assembly is positioned between the laundry basket and the heating system upstream of the heating system, whereby a flow of return air from the chamber passes through and is filtered by an air filter of the air filter assembly before flowing to the heating system. The air filter assembly includes a shell, a sealing member on a face of the shell, and a biasing element configured to bias the shell into sealing engagement with a housing of the laundry appliance.

In another aspect of the present disclosure, a laundry appliance is provided. The laundry appliance includes a cabinet that defines an interior volume with a housing mounted within the interior volume of the cabinet. An air filter assembly is positioned in the housing. The air filter assembly includes a shell, a sealing member on a face of the shell, and a biasing element configured to bias the shell into sealing engagement with the housing.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 13 illustrates an exemplary biasing element according to one or more embodiments of the present disclosure.

FIG. 14 illustrates a portion of an exemplary guide rail having a detent therein according to one or more embodiments of the present disclosure.

DETAILED DESCRIPTION

Figure 1:
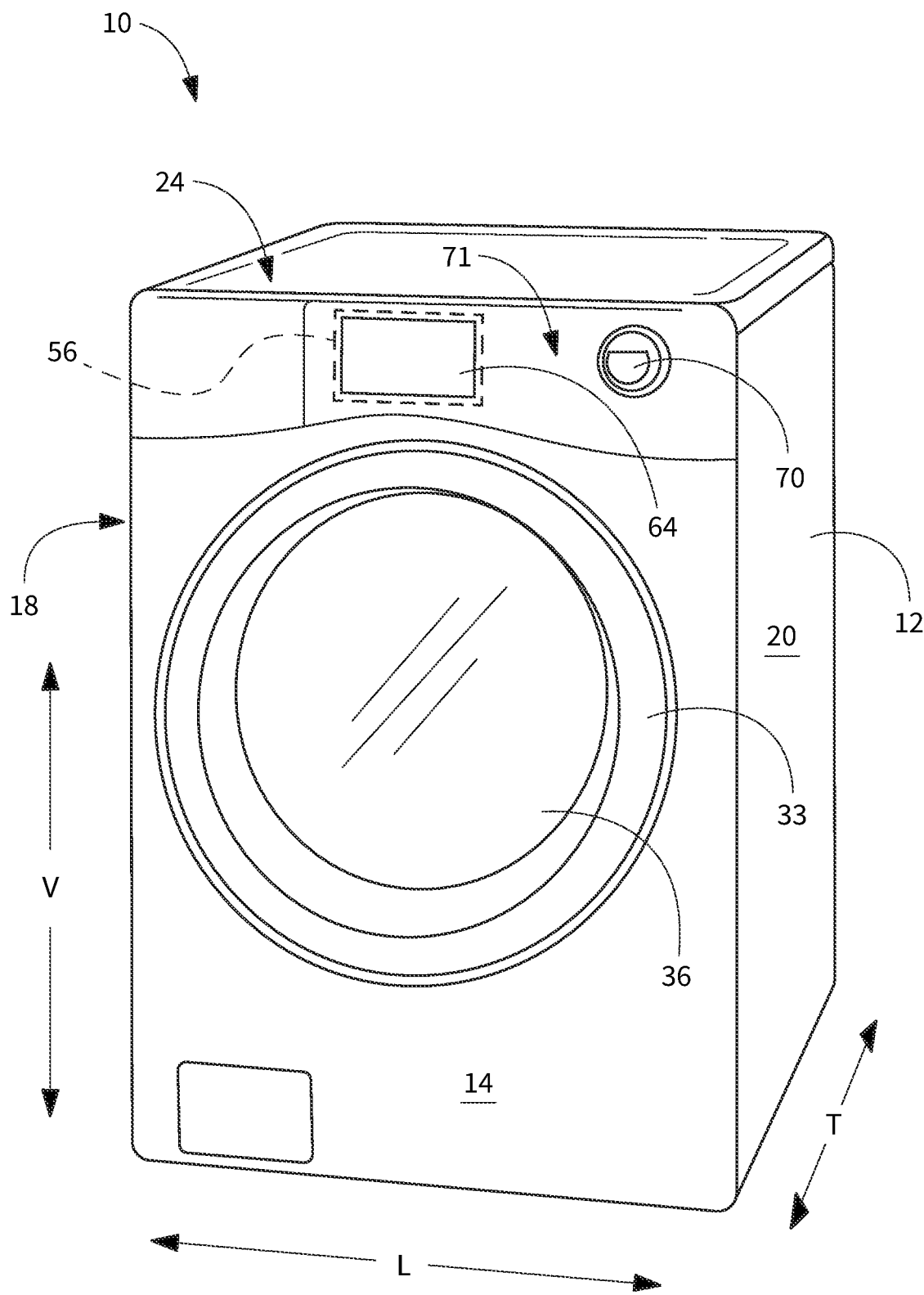
FIG. 1 provides a perspective view of a laundry appliance in accordance with one or more exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "substantially," "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

As used herein, the terms "articles," "clothing," or "laundry" include but need not be limited to fabrics, textiles, garments, linens, papers, or other items which may be cleaned, dried, and/or otherwise treated in a laundry appliance. Furthermore, the term "load" or "laundry load" refers to the combination of clothing that may be washed together in a washing machine appliance or dried together in a dryer appliance (e.g., clothes dryer), including washed and dried together in a combination laundry appliance, and may include a mixture of different or similar articles of clothing of different or similar types and kinds of fabrics, textiles, garments and linens within a particular laundering process.

Figure 2:
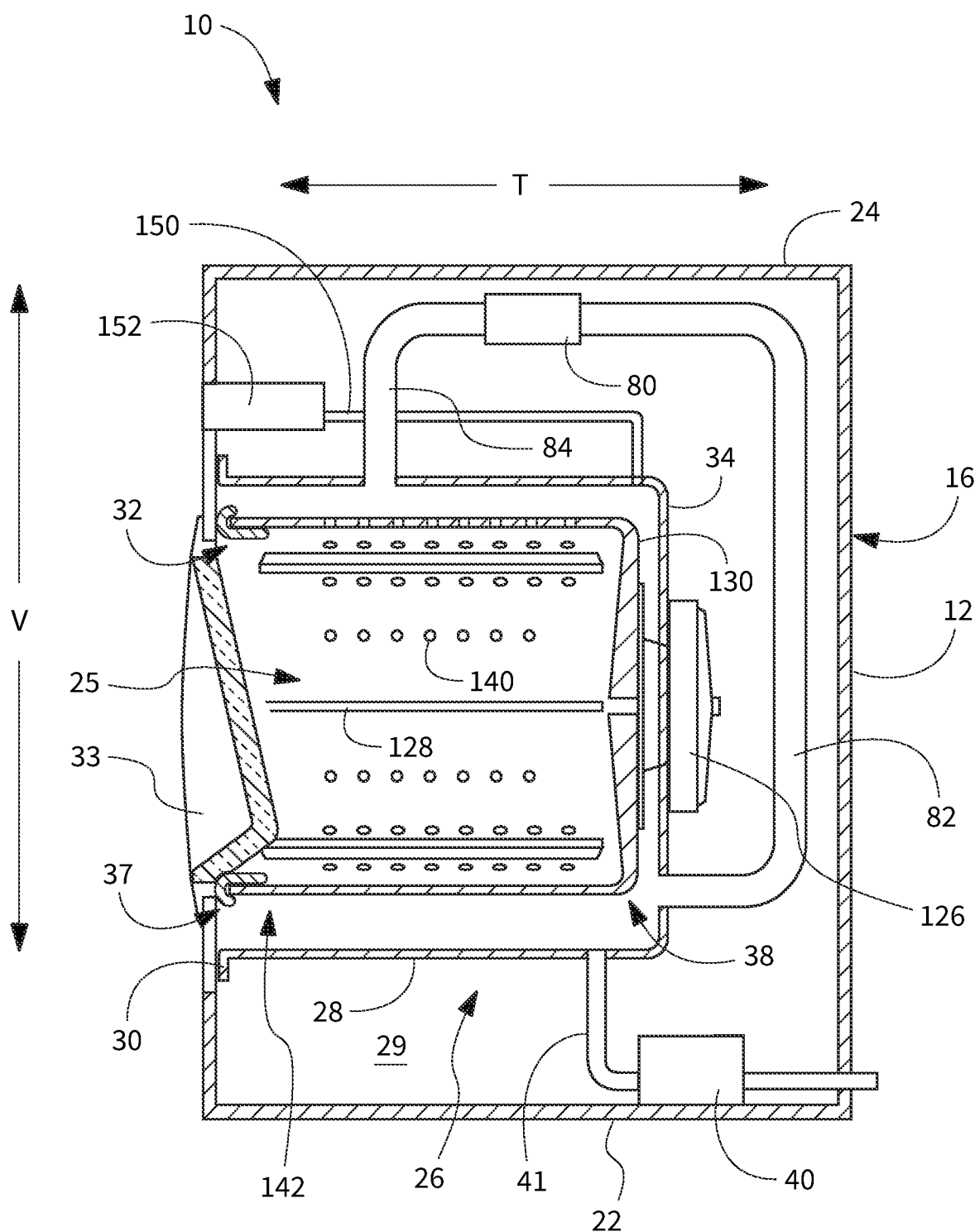
FIG. 2 provides a schematic cross-section view of the example laundry appliance of FIG. 1.
Figure 3:
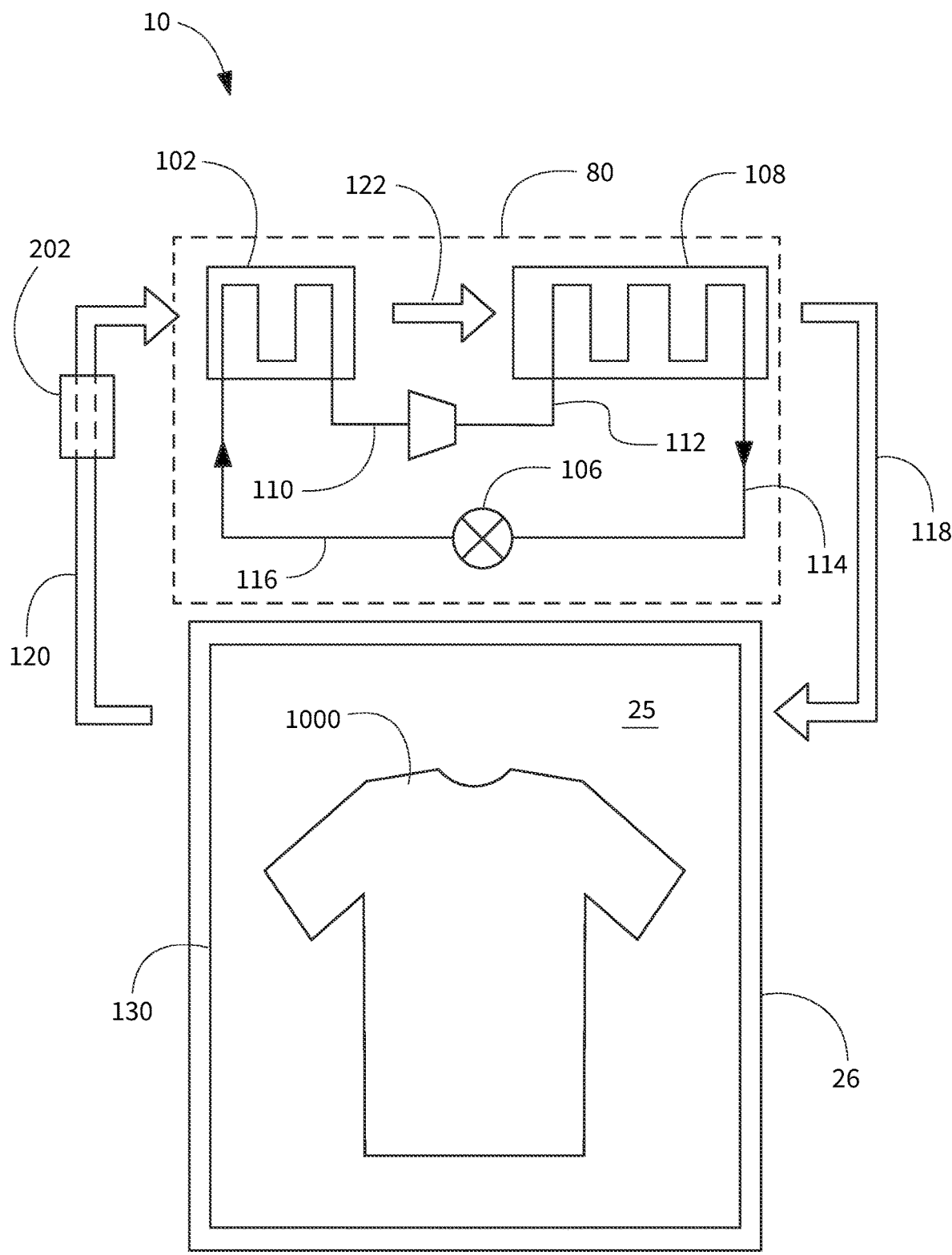
FIG. 3 provides a schematic diagram of an exemplary heat exchange heating system of the example laundry appliance of FIG. 1 according to one or more embodiments of the present disclosure.
Figure 4:
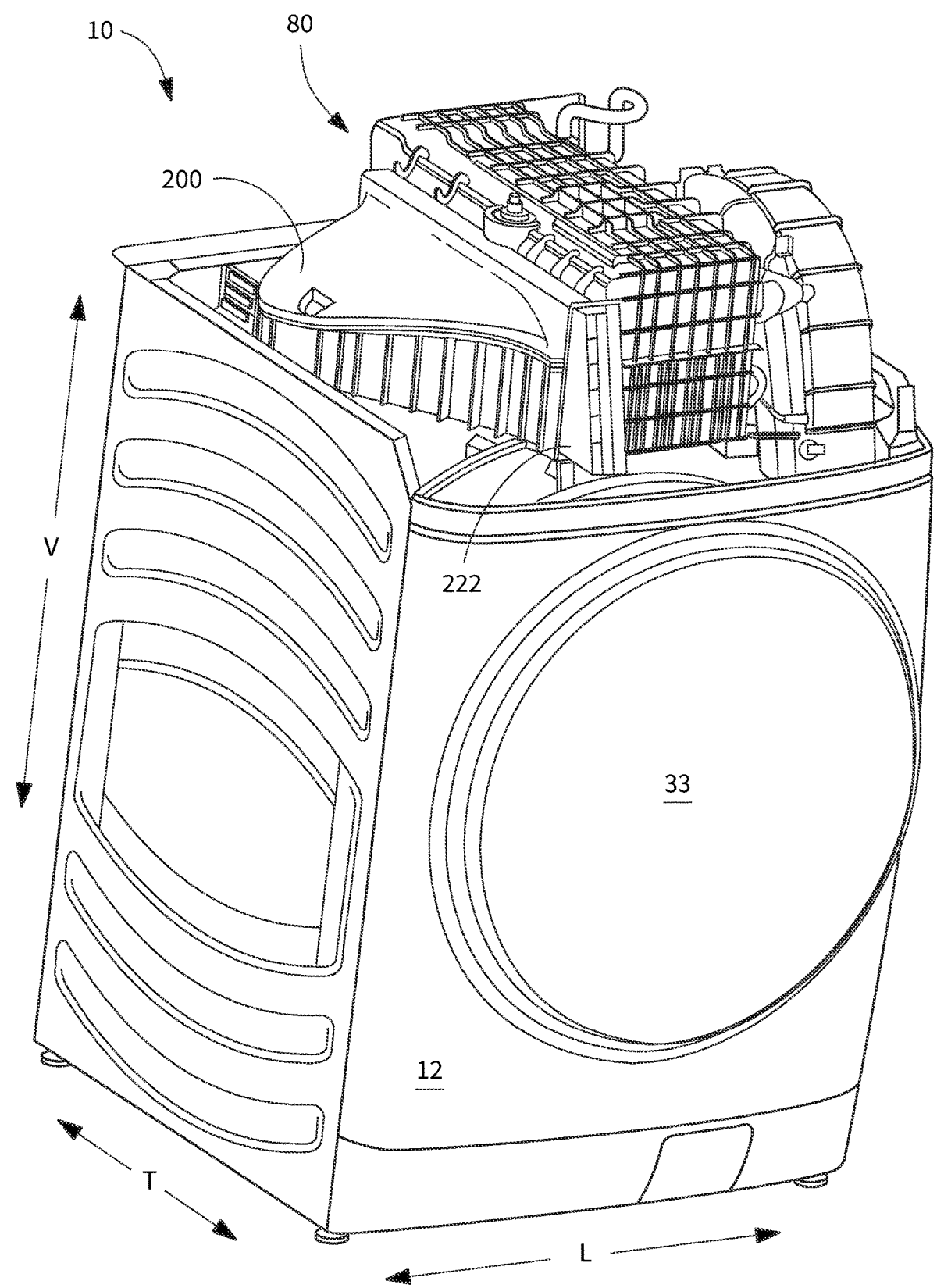
FIG. 4 provides a perspective view of the laundry appliance of FIG. 1 with a portion of a cabinet thereof removed to show internal components of the laundry appliance in accordance with one or more exemplary embodiments of the present disclosure.
Figure 5:
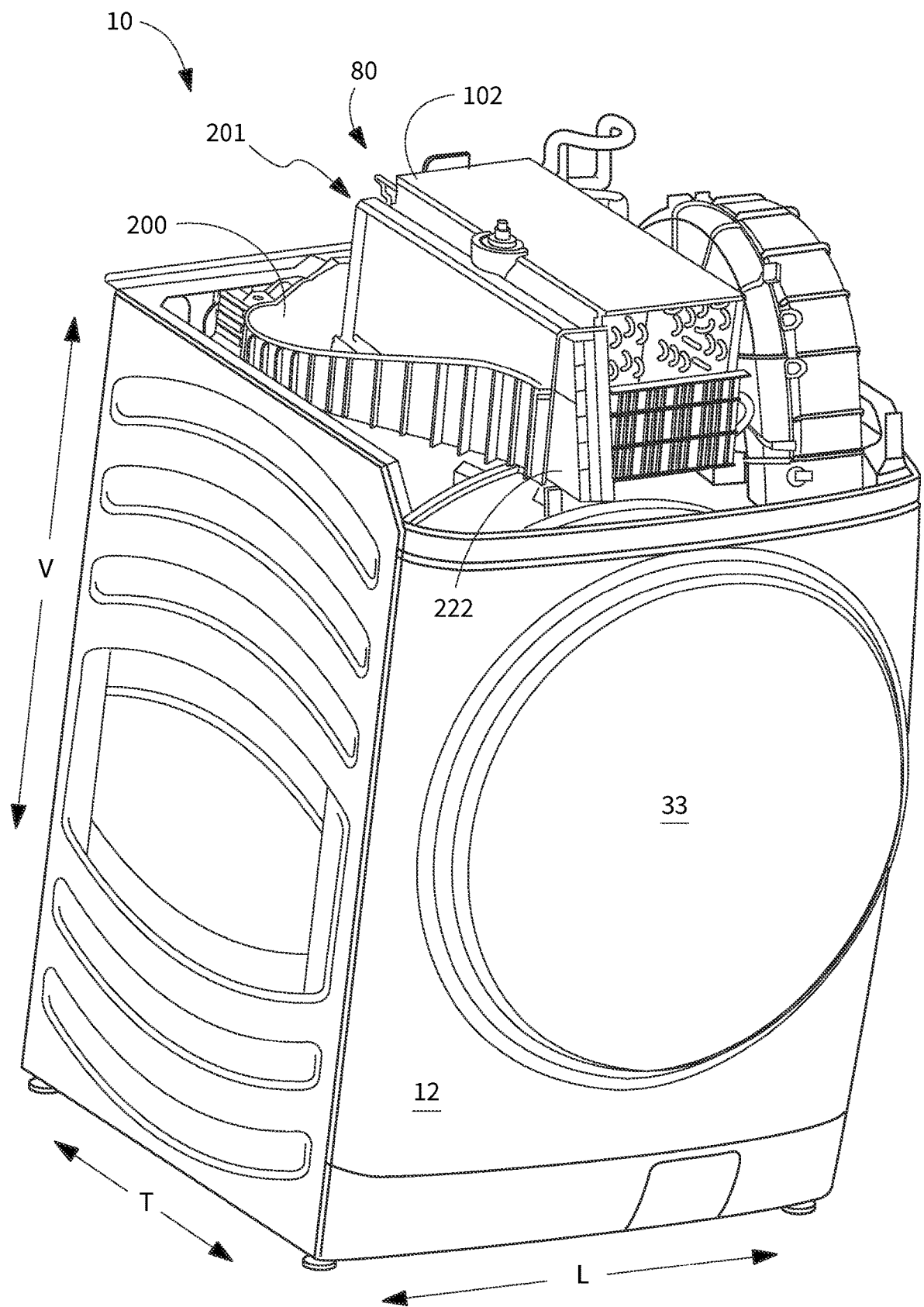
FIG. 5 provides another perspective view of the laundry appliance of FIG. 1 with portions of a housing removed to show an air filter assembly and a heating system therein in accordance with one or more exemplary embodiments of the present disclosure.

Embodiments of the present disclosure include a laundry appliance, e.g., a combination washer-dryer appliance, such as the example combination appliance 10 illustrated in FIGS. 1 through 5. FIG. 1 provides a perspective view of a laundry appliance 10 according to exemplary embodiments of the present disclosure. The laundry appliance 10 is a combination laundry appliance, and may also be referred to as a multifunction laundry appliance or washer/dryer combination appliance. FIG. 2 provides a section view of laundry appliance 10. FIG. 3 provides a schematic illustration of a heat pump heating system which may be incorporated into the laundry appliance 10. FIGS. 4 and 5 provide additional perspective views of the laundry appliance 10. The laundry appliance 10 generally defines a vertical direction V, a lateral direction L, and a transverse direction T, each of which is mutually perpendicular, such that an orthogonal coordinate system is defined. While described in the context of a specific embodiment of laundry appliance 10, using the teachings disclosed herein, it will be understood that laundry appliance 10 is provided by way of example only. Other laundry appliances having different appearances and different features may also be utilized with the present subject matter as well.

Cabinet 12 includes a front panel 14, a rear panel 16, a left side panels 18 and a right side panel 20 spaced apart from each other by front and rear panels 14 and 16, a bottom panel 22, and a top cover 24. As used herein, terms such as "left" and "right" or "front" and "back" refer to directions from the perspective of a user facing the laundry appliance 10 for accessing and/or operating the laundry appliance 10. For example, a user stands in front of the laundry appliance 10, e.g., at or near the front panel 14, to access door 33 and/or inputs 70 (the door 33 and inputs 70 are described in more detail below). Within cabinet 12, an interior volume 29 is defined. A drum or tub 26 is mounted within the interior volume 29. A laundry basket 130 is mounted within the tub 26. The laundry basket 130 defines a chamber 25 for receipt of articles of clothing for treatment, e.g., washing, rinsing, spinning, tumbling, and/or drying.

In some embodiments, one or more selector inputs 70, such as knobs, buttons, touchscreen interfaces, etc., may be provided or mounted on the cabinet 12, e.g., on a control panel 71 thereof and are in operable communication (e.g., electrically coupled or coupled through a wireless network band) with a processing device or controller 56. The control panel 71 may also include a display 64. Controller 56 may also be provided in operable communication with various components of the laundry appliance, such as the motor, blower, and/or heating system 80. In turn, signals generated in controller 56 direct operation of such components in response to the position of inputs 70. As used herein, "processing device" or "controller" may refer to one or more microprocessors, microcontroller, ASICS, or semiconductor devices and is not restricted necessarily to a single element. The controller 56 may be programmed to operate laundry appliance 10 by executing instructions stored in memory (e.g., non-transitory media). The controller 56 may include, or be associated with, one or more memory elements such as RAM, ROM, or electrically erasable, programmable read only memory (EEPROM). For example, the instructions may be software or any set of instructions that when executed by the processing device, cause the processing device to perform operations. It should be noted that controllers as disclosed herein are capable of and may be operable to perform any methods and associated method steps as disclosed herein. For example, in some embodiments, methods disclosed herein may be embodied in programming instructions stored in the memory and executed by the controller.

Tub 26 extends between a front portion 37 and a back portion 38. Tub 26 is generally cylindrical in shape, having an outer cylindrical wall 28 and a front flange or wall 30 that defines an opening 32 of tub 26, e.g., at front portion 37 of tub 26, for loading and unloading of articles into and out of a chamber 25 defined by and within a laundry basket 130 inside of the tub 26. Tub 26 includes a rear wall 34 opposite the front flange 30. A door 33 provides for closing or accessing tub 26 through opening 32. A window 36 (FIG. 1) may be provided in door 33 for viewing of the chamber 25 and/or laundry articles therein, e.g., during operation of the laundry appliance 10.

Laundry basket 130 is rotatably mounted within tub 26 such that the laundry basket 130 is rotatable about an axis of rotation. According to the illustrated embodiment, the axis of rotation is substantially parallel to the transverse direction T. In this regard, laundry appliance 10 is generally referred to as a "horizontal axis" or "front load" laundry appliance 10. However, it should be appreciated that aspects of the present subject matter may be used within the context of a vertical axis or top load laundry appliance as well.

Laundry appliance 10 includes a motor assembly 126 that is in mechanical communication with laundry basket 130 to selectively rotate laundry basket 130. The motor assembly 126 may be a pancake motor, as illustrated, or any other suitable type, size, or configuration of motor may be used to rotate laundry basket 130 according to various embodiments. For example, a motor, such as a brushless DC motor, may be mounted within the cabinet 12 and the motor may be coupled to the laundry basket 130 by a belt and pulley, whereby the motor rotates the laundry basket 130 through the belt and pulley.

Laundry basket 130 may define one or more agitator features that extend into chamber 25 to assist in agitation and cleaning of articles disposed within laundry chamber 25 during operation of laundry appliance 10. For example, as illustrated in FIG. 2, a plurality of ribs 128 extends from laundry basket 130 into chamber 25. In this manner, for example, ribs 128 may lift articles disposed in laundry basket 130 during rotation of laundry basket 130, such as during an agitation or rinse portion of a wash operation of the laundry appliance 10. During a drying operation of the laundry appliance 10, the ribs 128 may also lift articles in the chamber 25 of the laundry basket 130 and then allow such articles to tumble back to a bottom of laundry basket 130 as laundry basket 130 rotates.

As illustrated for example in FIG. 2, laundry basket 130 may also include a plurality of perforations 140 extending therethrough in order to facilitate fluid communication between chamber 25 and tub 26, e.g., whereby wash liquid may flow between the tub 26 and the chamber 25 during a wash operation or cycle and/or heated air may flow into the chamber 25 and moisture-laden air may flow out of the chamber 25 during a drying operation or cycle. A sump 142 is defined by tub 26 outside of laundry basket 130 at a bottom of the tub 26 along the vertical direction V. Thus, sump 142 is configured for receipt of, and generally collects, wash liquid (the wash liquid may include, e.g., water, and may also includes additives such as detergents, etc.) during wash operations of laundry appliance 10. For example, during a wash operation of laundry appliance 10, wash liquid may be urged (e.g., by gravity) from the chamber 25 within the laundry basket 130 to sump 142 through the plurality of perforations 140. A pump assembly 40 is located beneath tub 26 for gravity assisted flow when draining tub 26 (e.g., via a drain 41). Pump assembly 40 is also configured for recirculating wash liquid within tub 26.

In some embodiments, laundry appliance 10 includes an additive dispenser or spout 150. For example, spout 150 may be in fluid communication with a water supply (not shown) in order to direct fluid (e.g., clean water) into tub 26. Spout 150 may also be in fluid communication with the sump 142. For example, pump assembly 40 may direct wash liquid disposed in sump 142 to spout 150 in order to circulate wash liquid in tub 26.

As illustrated, a detergent dispenser drawer 152 may be slidably mounted within front panel 14. Detergent dispenser drawer 152 receives an additive (e.g., detergent, fabric softener, bleach, or any other suitable liquid or powder) and directs the additive to chamber 25 during operation of laundry appliance 10. According to the illustrated embodiment, detergent dispenser drawer 152 may also be fluidly coupled to spout 150 to facilitate the complete and accurate dispensing of the additive.

In exemplary embodiments, during operation of laundry appliance 10, laundry items are loaded into laundry basket 130 through opening 32, and an operation is initiated through operator manipulation of input selectors 70. For example, a wash cycle may be initiated such that tub 26 is filled with water, detergent, or other fluid additives (e.g., via spout 150). One or more water valves (not shown) can be controlled by laundry appliance 10 to provide for filling laundry basket 130 to the appropriate level for the amount of articles being washed or rinsed. By way of example, once laundry basket 130 is properly filled with fluid, the contents of laundry basket 130 can be agitated (e.g., with ribs 128) for an agitation phase of laundry items in laundry basket 130. During the agitation phase, the basket 130 may be motivated about the axis of rotation at a set speed (e.g., a tumble speed) by a motor. As the basket 130 is rotated, articles within the basket 130 may be lifted by ribs 128 and permitted to drop therein due to gravity.

After the agitation phase of the washing operation is completed, tub 26 can be drained. Laundry articles can then be rinsed (e.g., through a rinse cycle) by again adding fluid to tub 26, depending on the particulars of the cleaning cycle selected by a user. Ribs 128 may again provide agitation within laundry basket 130. One or more spin cycles may also be used. In particular, a spin cycle may be applied after the wash cycle or after the rinse cycle in order to wring wash liquid from the articles being washed. During a spin cycle, basket 130 is rotated at relatively high speeds. For instance, basket 130 may be rotated at one set speed (e.g., a pre-plaster speed) before being rotated at another set speed (e.g., a plaster speed). As would be understood by those of ordinary skill in the art, the pre-plaster speed may be greater than the tumble speed and the plaster speed may be greater than the pre-plaster speed. Moreover, agitation or tumbling of articles may be reduced as basket 130 increases its rotational velocity such that the plaster speed maintains the articles at a generally fixed position relative to basket 130.

After the spin cycle, a drying operation may begin. A supply duct 82 may be mounted to tub 26 and may extend between tub 26 and a heating assembly or system 80, whereby the tub 26 is downstream of the heating system 80 along the supply duct 82 such that the heating system 80 supplies heated air that has been heated by the heating system 80 to the tub 26 via the supply duct 82. A return duct 84 may also be mounted to the tub 26 and may extend between tub 26 and the heating system 80 whereby the tub 26 is upstream of the heating system 80 along the return duct 84 such that the heating system 80 receives relatively warm and humid air from the tub 26 via the return duct 84, e.g., air returns to the heating system 80 from the tub 26, e.g., after flowing over and around articles within the chamber 25, through the return duct 84. In some embodiments, e.g., as illustrated in FIGS. 2 and 3, the heating system 80 may be positioned above the tub 26 and the return duct 84 may be oriented generally along the vertical direction V, and the return duct 84 may also be referred to as a chimney. The supply duct 82 may be mounted to the tub 26, e.g., at the rear wall 34 thereof as in the illustrated example, or the supply duct 82 may be mounted to the cylindrical wall 28 of the tub 26, such as above the basket 130, similar to the return duct 84 in the illustrated example embodiment.

The heating system 80, may include, e.g., a resistance heating element, a gas burner, and/or a heat pump, such as the example heat pump embodiment illustrated in FIG. 3 and described in more detail below, or any other suitable heat source. Moisture laden, warm air is drawn from tub 26 by an air handler, such as a blower fan, which generates a negative air pressure within the chamber 25. As the air passes from the blower fan, it enters return duct 84 and then is passed into heating system 80. Heated air (with a lower moisture content than was received from tub 26), exits heating system 80 and is supplied to tub 26 by supply duct 82. After the clothing articles have been dried, they are removed from the chamber 25 via opening 32.

Turning now to FIG. 3, a schematic view of selected components of one or more exemplary embodiments of laundry appliance 10 is provided. In particular, FIG. 3 illustrates components used during drying operations of the laundry appliance 10. It is understood that, except as otherwise indicated, laundry appliance 10 in FIG. 3 may include some or all of the features described herein with respect to FIGS. 1, 2, 4, and 5.

In operation, one or more laundry articles 1000 may be placed within the chamber 25 of laundry basket 130. Hot dry air 118 may be supplied to chamber 25 whereby moisture within laundry articles 1000 may be drawn from the laundry articles 1000 by evaporation, such that warm saturated air 120 may flow from chamber 25 to an evaporator 102 of the heating system 80, e.g., via the return duct 84 illustrated in FIG. 2. As air passes across evaporator 102, the temperature of the air is reduced through heat exchange with refrigerant that is vaporized within, for example, coils or tubing of evaporator 102. This vaporization process absorbs both the sensible and the latent heat from the moisture-laden air-thereby reducing its temperature. As a result, moisture in the air is condensed and such condensate may be drained from heating assembly 80, as will be understood by those of ordinary skill in the art.

Air passing over evaporator 102 becomes drier and cooler than when it was received from tub 26 of laundry appliance 10. As shown, cool dry air 122 from evaporator 102 is subsequently caused to flow across a condenser 108 (e.g., across coils or tubing of the condenser 108), which condenses refrigerant therein. The refrigerant enters condenser 108 in a gaseous state at a relatively high temperature and pressure compared to the cool, dry air 122 from evaporator 102. As a result, heat energy is transferred to the air at the condenser section 108, thereby elevating the temperature of the air and providing hot dry air 118 for supply to the tub 26 of laundry appliance 10, e.g., via the supply duct 82 illustrated in FIG. 2. The hot dry air 118 passes over and around laundry articles 1000 within the chamber 25 inside of the tub 26, such that warm saturated air 120 is generated, as mentioned above. For example, the hot dry air may circulate around and through the articles 1000 while the articles 1000 are tumbled within the chamber 25 such as by rotating the basket 130, and the tumbling may be promoted by ribs 128 as well. Because the air is recycled through tub 26 and heating system 80, e.g., in a closed-loop as mentioned above, laundry appliance 10 can have a much greater efficiency than traditional clothes dryers where warm, moisture laden air is exhausted to the environment.

As shown in FIG. 3, some embodiments of heating system 80 include a compressor 104 that pressurizes refrigerant (i.e., increases the pressure of the refrigerant) supplied by a suction line 110 and generally motivates refrigerant through the sealed refrigerant circuit of heating system 80. Compressor 104 may be in operable communication with controller 56 and is generally designed to pressurize a gas phase refrigerant. Accordingly, in order to avoid damage, refrigerant in suction line 110 is supplied to the compressor 104 in a gas phase from the evaporator section 102. The pressurization of the refrigerant with compressor 104 increases the temperature of the refrigerant (e.g., as directed by controller 56). The compressed refrigerant is fed from compressor 104 to condenser 108 through line 112. As relatively cool air 122 from the evaporator 102 is passed over the condenser 108, the refrigerant is cooled and its temperature is lowered as heat is transferred to the air for supply to tub 26.

Upon exiting condenser 108, the refrigerant is fed through line 114 to an expansion device 106. Although only one expansion device 106 is shown, such is by way of example only. It is understood that multiple such devices may be used. In the illustrated example, expansion device 106 is a thermal expansion valve. In additional embodiments, any other suitable expansion device, such as a capillary tube, may be used as well as or instead of the thermal expansion valve 106. Expansion device 106 lowers the pressure of the refrigerant and controls the amount of refrigerant that is allowed to enter the evaporator 102 via line 116. Importantly, the flow of liquid refrigerant into evaporator 102 is limited by expansion device 106 in order to keep the pressure low and allow expansion of the refrigerant back into the gas phase in the evaporator 102. The evaporation of the refrigerant in the evaporator 102 converts the refrigerant from its liquid-dominated phase to a gas phase while cooling and drying the air 120 from tub 26. The process is repeated as air is circulated through tub 26 and between evaporator 102 and condenser 108 while the refrigerant is cycled through the sealed refrigerant circuit, as described above.

The laundry appliance 10 may include an air filter 202, e.g., positioned between the tub 26 and the heating system 80 with the air filter 202 upstream of the heating system 80, whereby air flowing from the chamber 25 passes through and is filtered by the air filter 202 before flowing to the heating system 80.

As mentioned, the air filter 202 filters the air, e.g., the air filter 202 may remove particles such as lint particles from the air, as well as dust, hair, or other airborne matter, as will be understood by those of ordinary skill in the art. Accordingly, such particles may accumulate on and in the air filter 202, and in particular on an outer surface or upstream surface of the air filter 202, over time. If left unchecked, such accumulated particles may eventually obstruct air flow through the filter 202, resulting in reduced efficiency or performance of the air filter 202 and/or the laundry appliance 10, such as the heating system 80 of the laundry appliance 100. Thus, the air filter 202 may be user accessible, e.g., to permit a user to clean the air filter 202.

FIG. 4 provides a perspective view of laundry appliance 10 with a portion, e.g., an upper portion such as top cover 24, of the cabinet 12 thereof removed to reveal internal components of the laundry appliance 10. As illustrated in FIGS. 4 and 5, the heating system 80 may be enclosed within a housing 200. As may be seen in FIG. 5, where an upper portion of the housing 200 is also removed, e.g., in addition to the portion of the cabinet 12, the heating system 80 may include a heat exchanger, e.g., evaporator 102 (see, e.g., FIG. 3) and an air filter assembly 201 may be positioned between the laundry basket 130 and the heating system 80. The air filter 202 may be a part of the air filter assembly 201. For example, the air filter assembly 201 and the air filter 202 therein may be positioned upstream of the heating system 80, such as upstream of the evaporator 102 of the heating system 80, e.g., where the evaporator 102 is the furthest upstream portion or component of the heating system 80, e.g., the first component of the heating system 80 to receive a flow of warm, moist air from the chamber 25. With the air filter assembly 201 so positioned, a flow of return air 120 (FIG. 3) from the chamber 25 may pass through and may be filtered by the air filter 202 before flowing to the heating system 80. For example, the air filter 202 may include a porous or air-permeable material, such as a foam material, which permits air to flow therethrough while trapping particles above a specified size therein. The air filter 202 and/or air filter assembly 201 may be removable from the housing 200. For example, the air filter assembly 201 may also include a handle 222, e.g., on an outer end of a shell 208 (FIG. 7) thereof, such as may be grasped by a user to extract the air filter assembly 201 from the housing 200.

Figure 6:
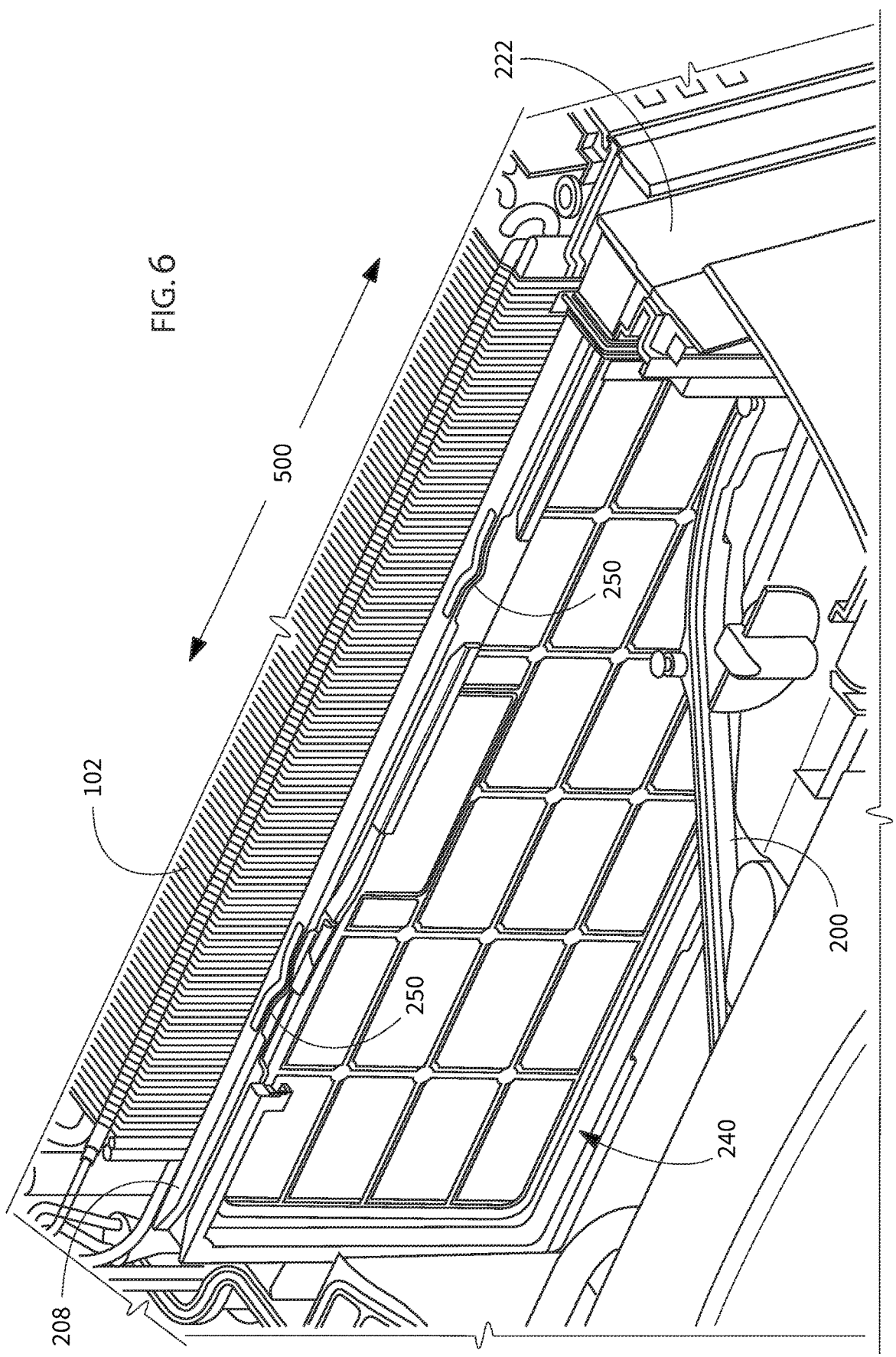
FIG. 6 provides a perspective view of a portion of the laundry appliance as illustrated in FIG. 5.

FIG. 6 provides a perspective view of a lower half of the housing (e.g., the upper half of the housing is removed in FIG. 6 in order to depict internal structures of the housing 200 and to depict the air filter assembly 201 in the inserted position in the housing). In various embodiments, the air filter assembly 201 may include one or more biasing elements thereon, such as on a shell 208 of the air filter assembly 201, and the one or more biasing elements may be configured to bias the shell 205 into sealing engagement with the housing 200. For example, as illustrated in FIG. 6, the biasing element or biasing elements may be a leaf spring 250 or leaf springs 250. In particular, FIG. 6 illustrates two top leaf springs 250, e.g., positioned at a top edge of the shell 208, and such embodiments may be mirrored, such as may also include two bottom leaf springs, which are not visible in the view of FIG. 6, but which those of ordinary skill in the art will recognize may be positioned opposite the two top leaf springs 250 seen in FIG. 6, e.g., vertically aligned with the two top leaf springs 250 on a bottom edge of the shell 208. As mentioned above, the air filter assembly 201 may be removable from the housing 200. For example, the air filter assembly 201 may be inserted into and removed from the housing 200 along a travel direction 500, as indicated in FIG. 6. As illustrated in FIG. 6, the air filter assembly 201 may move, e.g., translate, along the travel direction 500, such as may be inserted into the housing 200 by moving along the travel direction 500 generally up and to the left on the page in FIG. 6, and the air filter assembly 201 may be removed from the housing 200 by moving along the travel direction 500 generally down and to the right on the page in FIG. 6.

Figure 7:
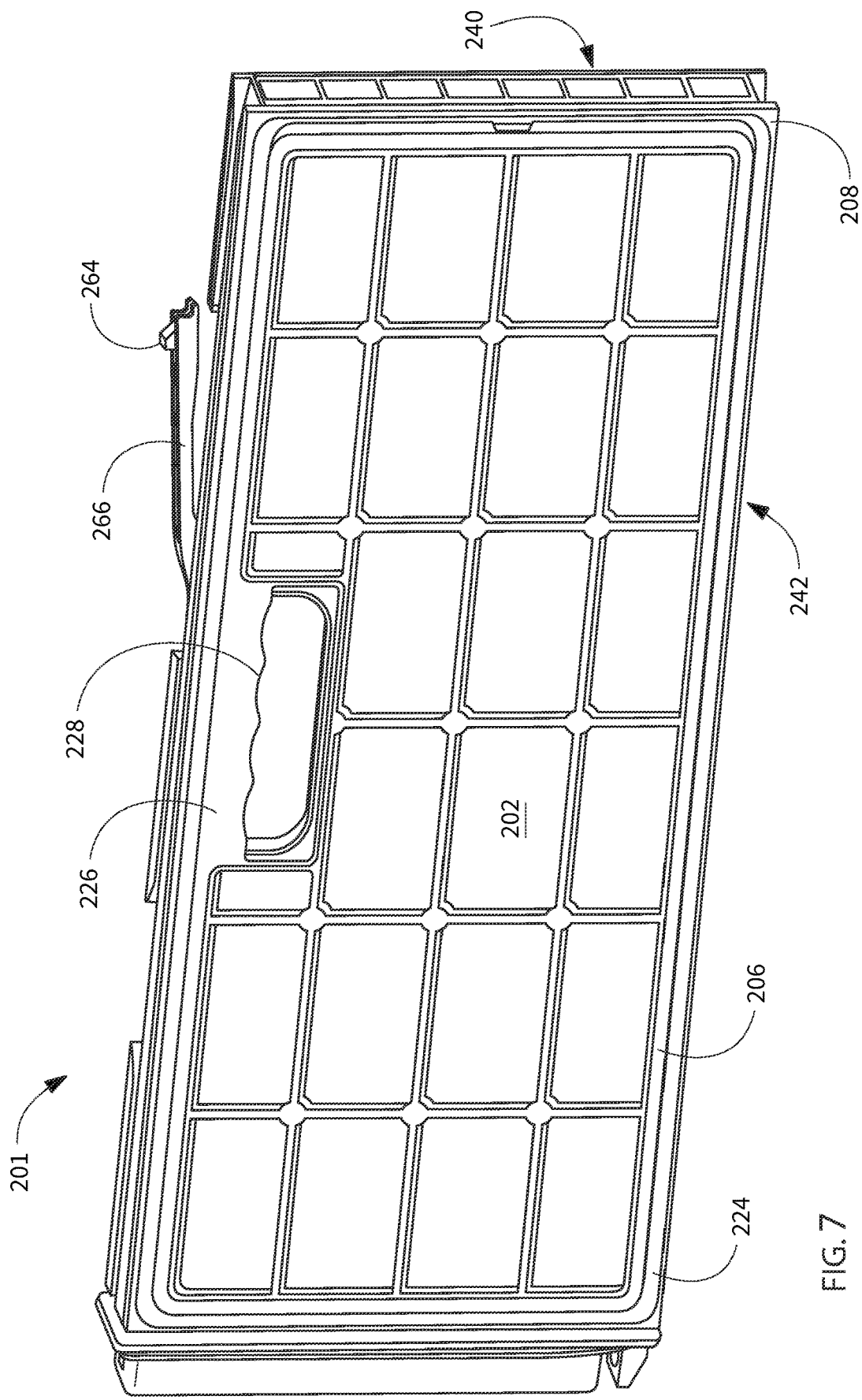
FIG. 7 provides a perspective view of the air filter assembly.

FIG. 7 provides a perspective view of an exemplary air filter assembly 201 according to one or more embodiments of the present disclosure. As illustrated in FIG. 7, the air filter assembly 201 may include an outer shell 208 which interfaces with the housing 200 and a frame 206 mounted in the shell 208. The air filter 202 may be mounted to the frame 206. For example, the frame 206 may be releasably mounted in the shell 208 and/or the filter 202 may be releasably mounted to the frame 206, such as to remove the filter 202 and/or frame 206 for cleaning, e.g., to remove accumulated dust, lint, and/or other similar particles which may become entrapped in or on the air filter 202 over time after use. For example, the air filter 202 may be removed from the air filter assembly 201, e.g., after taking the air filter assembly 201 out of the housing 200.

In some embodiments, e.g., as illustrated in FIG. 7, the air filter assembly 201 may also include a latch 264. For example, the latch 264 may be mounted on, such as integrally joined to, a cantilevered arm 266. In some embodiments, the cantilevered arm may be joined to the shell 208 of the air filter assembly 201.

Also as may be seen in FIG. 7, the air filter assembly 201 may further include a gasket 224, e.g., on the shell 208 and surrounding the air filter 202. The air filter 202 and/or air filter assembly 210 may include an upstream side 240 (see also FIG. 6) and a downstream side 242, e.g., with respect to the flow of return air from the chamber 25 to the heating assembly 80. For example, the downstream side 242 of the air filter 202 and/or air filter assembly 201 may be proximate to and face towards the heating system 80, whereas the upstream side 240 may be opposite the downstream side 242, e.g., the upstream side 240 may be the farthest side of the air filter assembly 201 from the heating system 80 and may face away from the heating system 80, such as towards the return duct 84. For example, the gasket 224 may be disposed on the downstream side 242 of the air filter assembly 201, e.g., whereby the gasket 224 sealingly engages the heating system 80 and/or an intervening portion of the housing 200 between the air filter assembly 201 and the heating system 80 when the air filter assembly 201 is in an installed position within the housing 200. For example, the biasing element(s), such as leaf springs 250 as in the example embodiment of FIG. 6 described above, may bias the air filter assembly 201 towards a portion of the housing 200 to promote compression of the gasket 224 and thereby bias the shell 208 into sealing engagement with the housing 200. The portion of the housing 200 may be an aperture through which the heating system 80 is in fluid communication with the air filter assembly 201.

Figure 8:
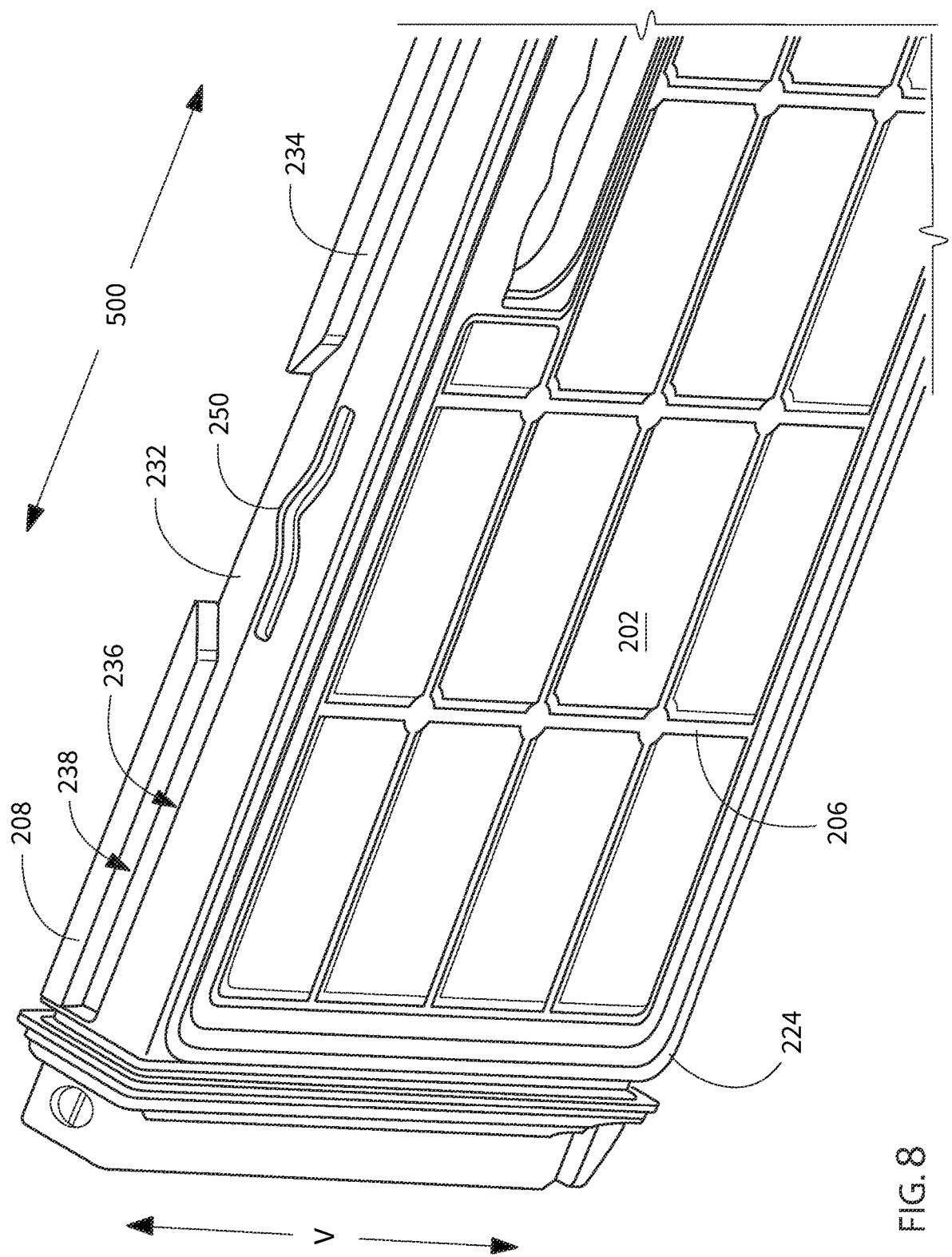
FIG. 8 provides an enlarged perspective view of a portion of the air filter assembly of FIG. 7.

As may be seen, e.g., in FIG. 8, in some embodiments, the air filter assembly 201 may include a guide channel 238, e.g., which is configured to receive a guide rail 214 (see FIGS. 9, 12, and 14-16) of the housing 200. For example, the housing 200 may include upper and lower guide rails 214, and the air filter assembly may include upper and lower guide channels 238. An exemplary upper guide channel 238 may be seen in FIG. 8, and those of ordinary skill in the art will recognize that the lower guide channel 238 may be a mirror image of the illustrated upper guide channel 238. As shown in FIG. 8, the upper guide channel 238 may be defined by a guide surface 232, e.g., which is configured to contact a lower edge of the upper guide rail 214 (while the guide surface in the lower guide channel of the air filter assembly 201 will be configured to contact an upper edge of the lower guide rail 214 of the housing 200), a first wall 234 and an opposite second wall 236. The biasing element or biasing elements may be positioned in the guide channel(s), such as the exemplary leaf spring 250 biasing element illustrated in FIG. 8. Thus, in some embodiments, the biasing element(s) may be configured to bias against the upper or lower guide rail 214 of the housing 200 in order to bias the shell 208 into sealing engagement with the housing 200, e.g., via the gasket 224 on the shell 208. The travel direction 500 along which the air filter assembly 201 moves, e.g., translates, to insert into or remove from the housing 200 may be defined by the guide channel 238, e.g., the guide channel 238 may guide the air filter assembly 201 along the travel direction 500 during insertion or removal, such as the interaction or cooperation of the guide channel(s) 238 of the air filter assembly 201 and corresponding guide rail(s) 214 (see, e.g., FIG. 9) of the housing 200 may guide the air filter assembly 201 along the travel direction 500 during insertion or removal.

Figure 9:
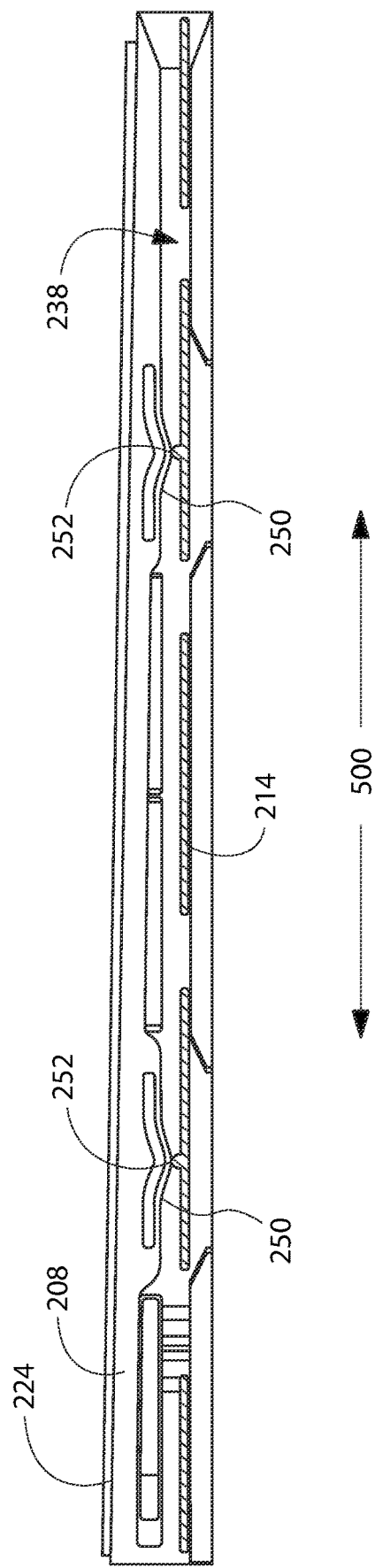
FIG. 9 provides an orthogonal view of the air filter assembly and a section of the guide rail.

FIG. 9 provides an end view of the air filter assembly 201 and an exemplary guide rail 214 of the housing 200. The end view of FIG. 9 may be a top view looking down, e.g., with a section cut taken through the housing 200 at the upper guide rail 214 and looking down at the top guide channel and top biasing elements of the air filter assembly 201, or may be a bottom view looking up, e.g., with a section cut taken through the housing 200 at the lower guide rail 214 and looking up at the bottom guide channel and lower biasing elements of the air filter assembly 201, where the guide rails 214, guide channels 238, and biasing elements are mirrored as described above. Also as may be seen in FIG. 9, the guide rail(s) 214 may include a protrusion 252 configured to engage the biasing element, or a plurality of protrusions 252 each configured to engage a respective one of the biasing elements, when the air filter assembly 201 is fully inserted within the housing 200. Also as may be seen in FIG. 9, the biasing element(s) may be positioned and oriented opposite the gasket 224 on the shell 208 of the air filter assembly 201, whereby the biasing element(s), e.g., when engaged with the guide rail(s) 214, urge the air filter assembly 201 towards the heating system 80, such as to generally urge the gasket 224 towards an aperture in the housing 200 that opens to the heating system 80, which may also compress the gasket 224 against the aperture or otherwise promote or bias the shell 208 and the gasket 224 thereon into sealing engagement with the housing 200 and/or heating system 80.

Figure 10:
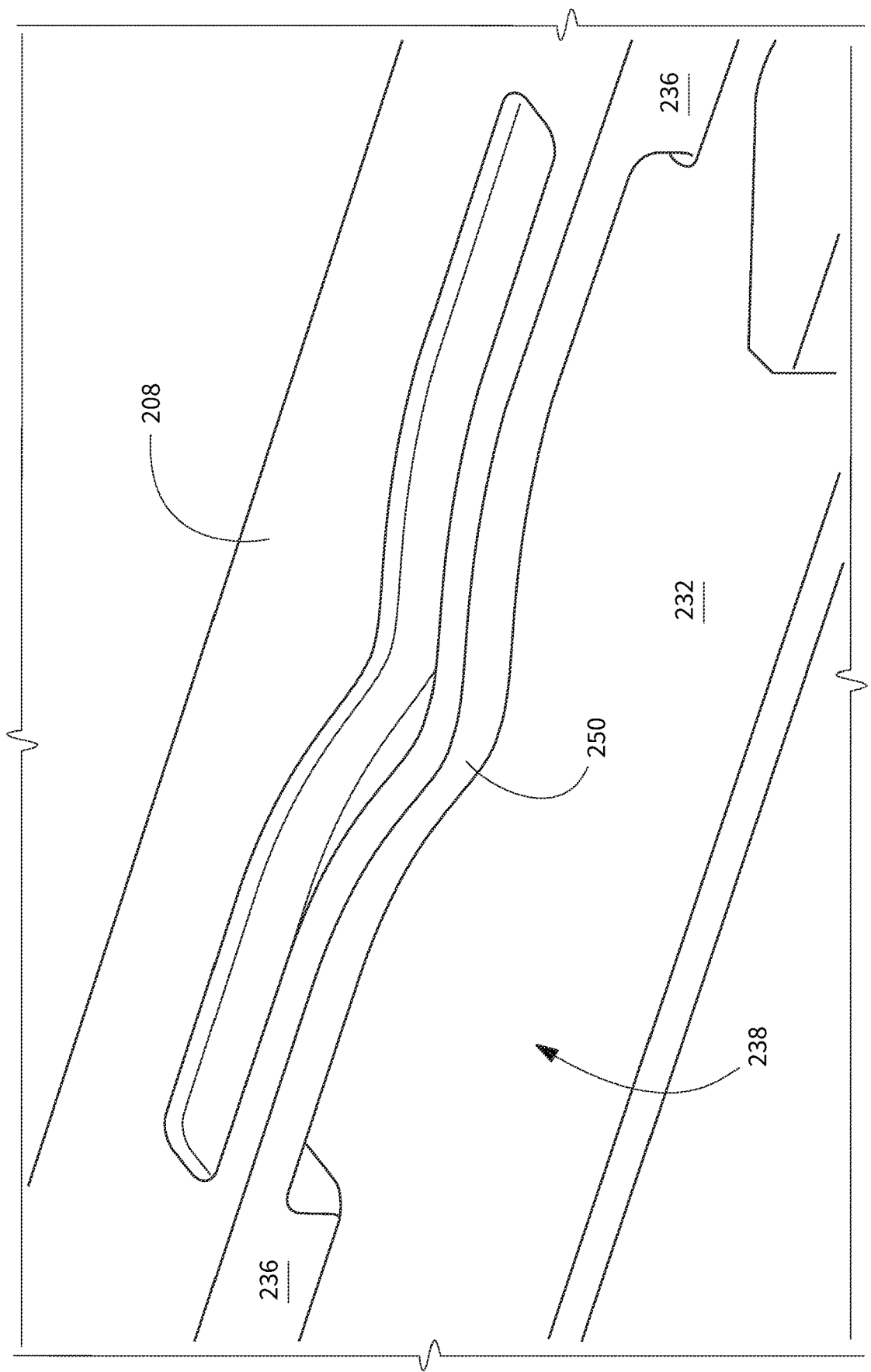
FIG. 10 provides a an enlarged perspective view of a portion of the air filter assembly of FIG. 7.
Figure 11:
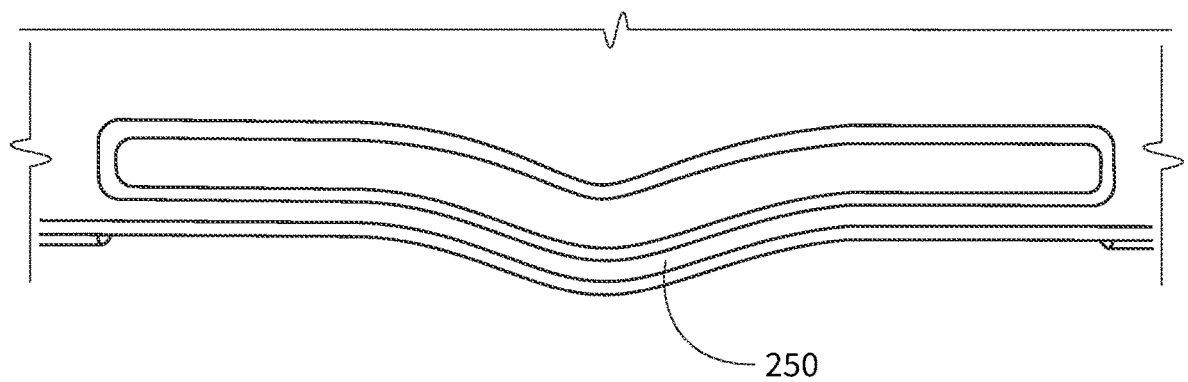
FIG. 11 provides a an enlarged view of a portion of the air filter assembly of FIG. 7.

FIG. 10 provides an enlarged perspective of a portion of one of the guide channels 238 defined in the shell 208 of the air filter assembly 201 and an exemplary leaf spring 250 (which is, as described above, an embodiment of the biasing element) therein. FIG. 11 provides a top view or bottom view of an exemplary leaf spring 250 in an unbiased condition. In some embodiments, e.g., as illustrated in FIGS. 10 and 11, the leaf spring 250 may be integrally formed with the shell 208.

Figure 12:
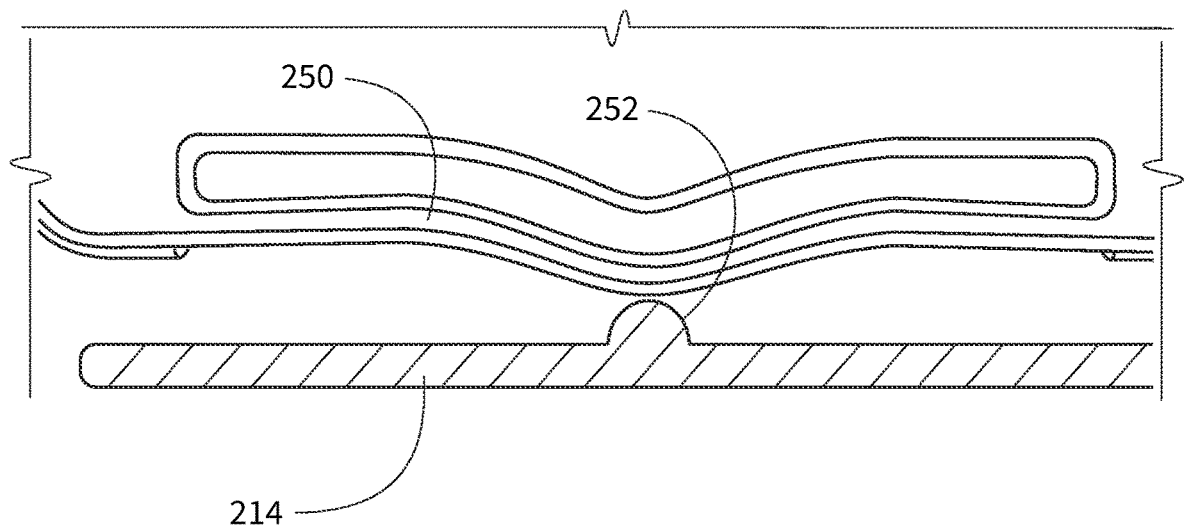
FIG. 12 illustrates the portion of the air filter assembly from FIG. 11 with a portion of a guide rail.

FIG. 12 provides a similar view a FIG. 11, where the leaf spring 250 is biased due to engagement with a corresponding protrusion 252 of the guide rail 214, such as when the air filter assembly 201 is fully inserted within the housing 200. For example, as illustrated in FIGS. 9 and 12, the protrusion 252 may be oriented generally perpendicular to the travel direction 500.

As illustrated in FIGS. 13-16, in some embodiments, the biasing element may include a coil spring 254 and a ball 256. For example, as may be seen in FIG. 13, the coil spring 254 may be attached to the shell 208, e.g., at one of the first wall 234 or the second wall 236 of the shell 208, whereby the coil spring 254 extends into the guide channel 238, at a first end of the coil spring 254, and the ball 256 may be coupled to the coil spring 254 at a second end of the coil spring 254 opposite the first end of the coil spring 254. In such embodiments, e.g., as illustrated in FIG. 14, the guide rail 214 of the housing 200 may include a detent 258 and the detent 258 may be oriented generally perpendicular to the travel direction 500. In such embodiments, the ball of 256 the biasing element may be configured to engage the detent 258 in the guide rail 214, e.g., the ball 256 and the detent 258 may be configured for such engagement in that the ball 256 and the detent 258 have complimentary shapes and similar sizes, e.g., matching curvatures and the detent 258 may be slightly larger than the ball 256 such that the ball 256 fits into, e.g., may be snugly received within, the detent 258 (see, e.g., FIG. 16).

Figure 15:
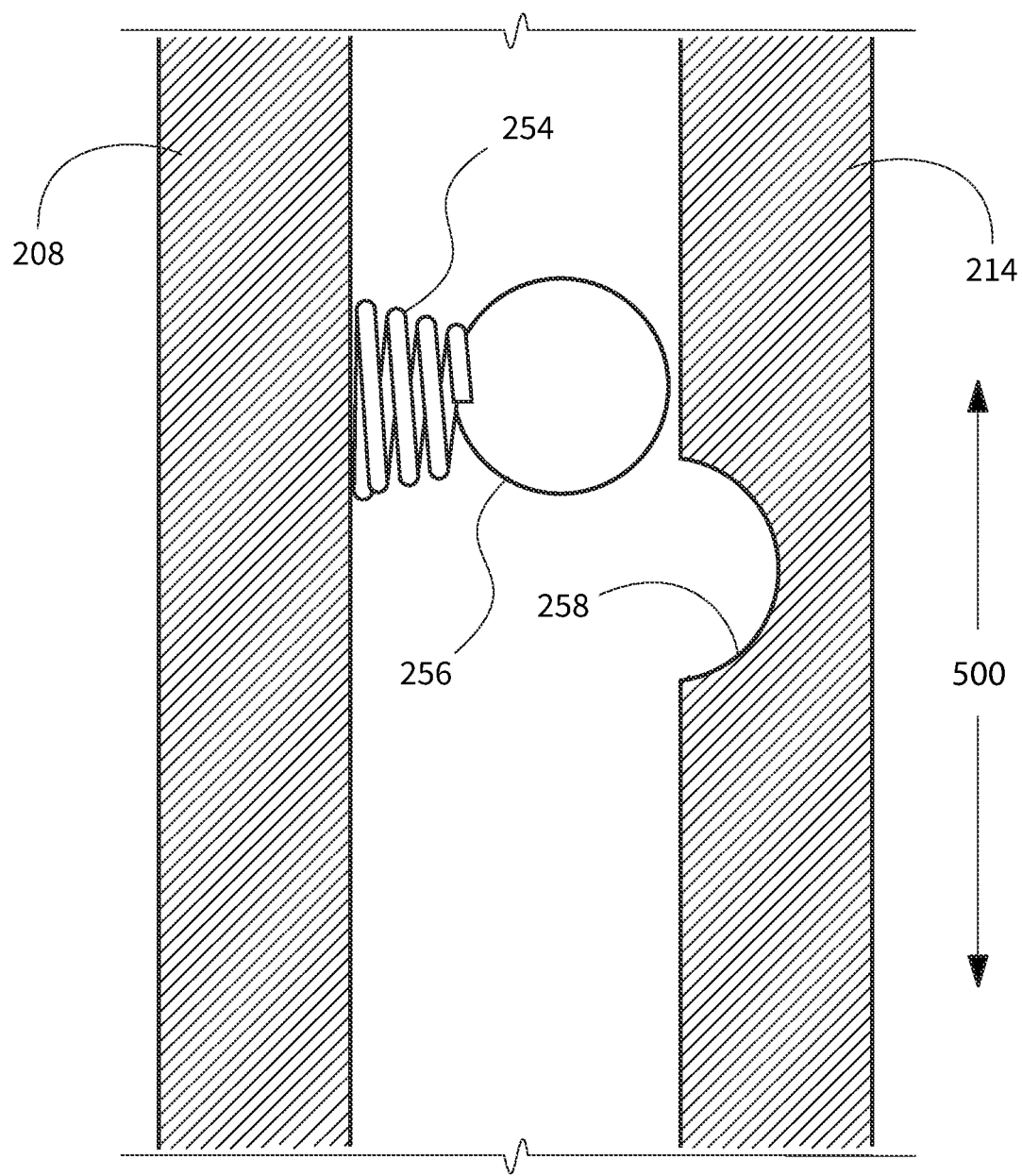
FIG. 15 illustrates a portion of an air filter assembly and a portion of a housing according to one or more embodiments of the present disclosure with the air filter assembly partially installed in the housing.
Figure 16:
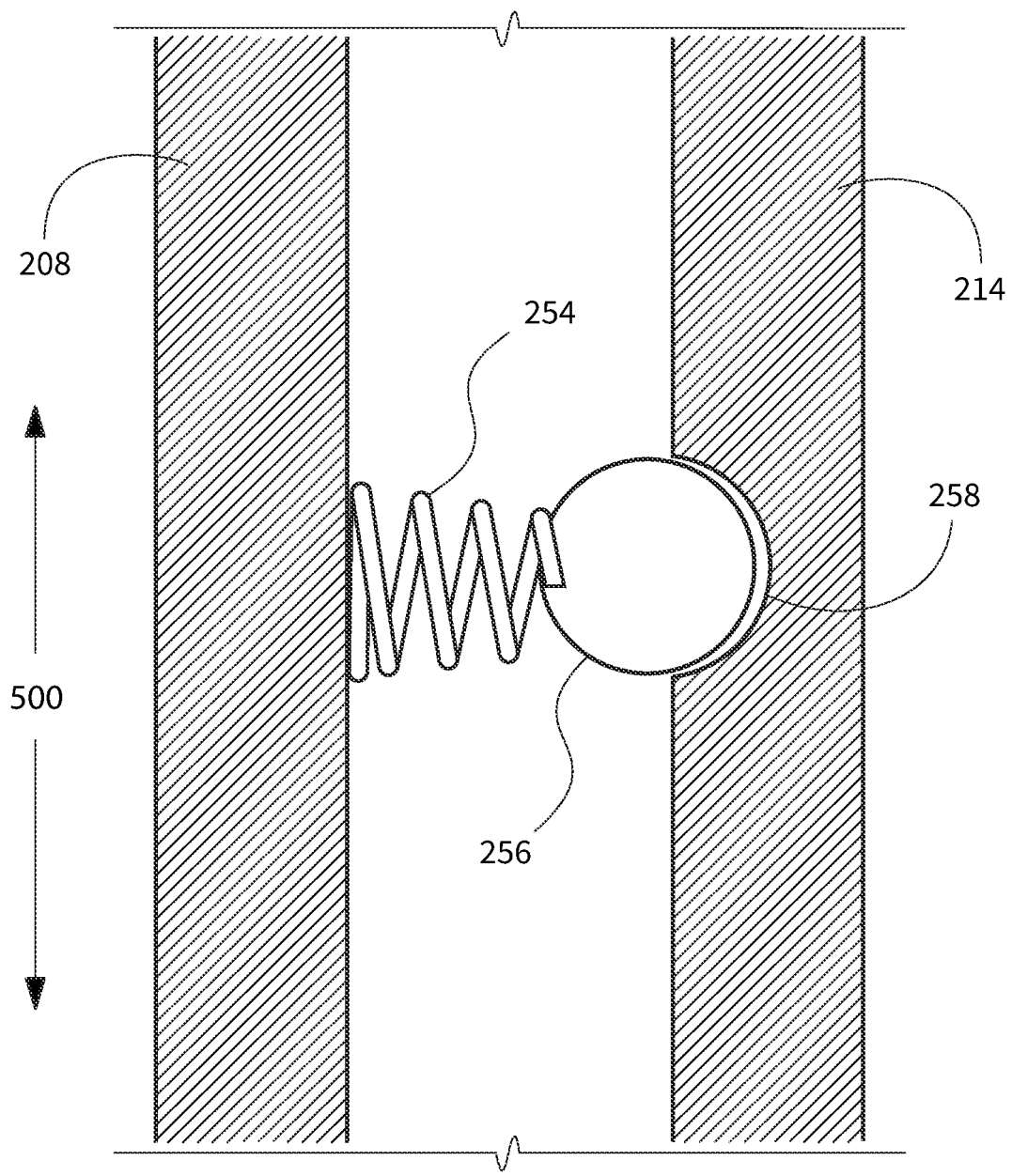
FIG. 16 illustrates the portion of the air filter assembly and the portion of the housing of FIG. 15 with the air filter assembly fully installed in the housing.

FIG. 15 illustrates a portion of the shell 208 (with the coil spring 254 and ball 256 mounted thereon) and a portion of the guide rail 214 (including the detent 258 formed therein) with the air filter assembly 201 in a partially inserted position within the housing 200. FIG. 16 illustrates portions of the shell 208 and guide rail 214 with the air filter assembly 201 in an inserted position, e.g., a fully inserted position, within the housing 200. Referring now to FIGS. 15 and 16 collectively, it may be seen that as the air filter assembly 201, e.g., the shell 208 thereof, travels along the travel direction 500 in an insertion direction (which is downwards on the page in FIGS. 15 and 16), the coil spring 254 is fully compressed (FIG. 15) while the air filter assembly is partially inserted into the housing 200 and, when the air filter assembly 201 reaches the fully inserted position (FIG. 16) within the housing 200, the coil spring 254 urges the ball 256 into engagement with the detent 258 in the guide rail 214. Also, those of ordinary skill in the art will recognize that, in the illustrated exemplary embodiments, the coil spring 254 is uncompressed in FIG. 13 and is partially compressed when the air filter assembly 201 is fully inserted into the housing 200 and the ball 256 is engaged with the detent 258. Such partial compression of the coil spring 254 when the air filter assembly 201 is fully inserted into the housing 200 may serve to urge the air filter assembly 201, such as the shell 208 thereof and the gasket 224 on the shell 208, towards the heating system 80, such as into sealing engagement with the housing 200 and/or heating system 80, e.g., as described above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A laundry appliance, comprising:
a cabinet defining an interior volume;
a tub mounted within the interior volume of the cabinet;
a laundry basket rotatably mounted within the tub, the laundry basket defining a chamber for receipt of articles for treatment;
a heating system in thermal communication with the chamber whereby heated air flows from the heating system to the chamber;
an air filter assembly positioned between the laundry basket and the heating system upstream of the heating system, whereby a flow of return air from the chamber passes through and is filtered by an air filter of the air filter assembly before flowing to the heating system, the air filter assembly comprising a shell, a sealing member on a face of the shell, and a biasing element configured to bias the shell into sealing engagement with a housing of the laundry appliance, the biasing element oriented opposite the sealing member on the face of the shell, wherein the air filter assembly is removably positioned in the housing, wherein the housing comprises a guide rail, wherein the air filter assembly is configured to translate in a travel direction along the guide rail between an inserted position in the housing and an extracted position at least partially outside of the housing, and wherein the guide rail is configured to engage the biasing element; and
a guide channel in the shell, the biasing element positioned in the guide channel, wherein the guide rail of the housing is aligned with the guide channel in the shell of the air filter assembly when the air filter assembly is in the inserted position.

2. The laundry appliance of claim 1, wherein the guide rail comprises a protrusion configured to engage the biasing element and wherein the protrusion is generally perpendicular to the travel direction.

3. The laundry appliance of claim 1, wherein the guide rail comprises a detent configured to engage the biasing element and wherein the detent is generally perpendicular to the travel direction.

4. The laundry appliance of claim 1, wherein the biasing element is integrally formed with the shell.

5. The laundry appliance of claim 1, wherein the biasing element comprises a coil spring and a ball.

6. The laundry appliance of claim 5, wherein the ball of the biasing element is configured to engage a detent in the guide rail.

7. The laundry appliance of claim 1, wherein the biasing element comprises a leaf spring.

8. The laundry appliance of claim 7, wherein the leaf spring is configured to engage a protrusion of the guide rail.

9. A laundry appliance, comprising:
a cabinet defining an interior volume;
a housing mounted within the interior volume of the cabinet;
an air filter assembly positioned in the housing, the air filter assembly comprising a shell, a sealing member on a face of the shell, and a biasing element configured to bias the shell into sealing engagement with the housing, the biasing element oriented opposite the sealing member on the face of the shell, wherein the air filter assembly is removably positioned in the housing, wherein the housing comprises a guide rail, wherein the air filter assembly is configured to translate in a travel direction along the guide rail between an inserted position in the housing and an extracted position at least partially outside of the housing, and wherein the guide rail is configured to engage the biasing element; and
a guide channel in the shell, the biasing element positioned in the guide channel, wherein the guide rail of the housing is aligned with the guide channel in the shell of the air filter assembly when the air filter assembly is in the inserted position.

10. The laundry appliance of claim 9, wherein the guide rail comprises a protrusion configured to engage the biasing element and wherein the protrusion is generally perpendicular to the travel direction.

11. The laundry appliance of claim 9, wherein the guide rail comprises a detent configured to engage the biasing element and wherein the detent is generally perpendicular to the travel direction.

12. The laundry appliance of claim 9, wherein the biasing element is integrally formed with the shell.

13. The laundry appliance of claim 9, wherein the biasing element comprises a coil spring and a ball.

14. The laundry appliance of claim 13, wherein the ball of the biasing element is configured to engage a detent in the guide rail.

15. The laundry appliance of claim 9, wherein the biasing element comprises a leaf spring.

16. The laundry appliance of claim 15, wherein the leaf spring is configured to engage a protrusion of the guide rail.

* * * * *